United States Patent [19]

Hanson et al.

[11] Patent Number: 5,050,771
[45] Date of Patent: Sep. 24, 1991

[54] REPEATABLE PATTERN FIELD SPRAYING CONTROL

[75] Inventors: Lowell D. Hanson, White Bear Lake; John R. Schafer, Minneapolis, both of Minn.

[73] Assignee: Field Control Systems, Inc., Roseville, Minn.

[21] Appl. No.: 387,710

[22] Filed: Jul. 31, 1989

[51] Int. Cl.⁵ .............................................. B67B 7/00
[52] U.S. Cl. ........................................ 222/1; 222/52; 239/1
[58] Field of Search .................. 222/1, 52, 55, 63, 23; 239/1, 155; 364/424.01, 424.07

[56] References Cited

U.S. PATENT DOCUMENTS

| | | | |
|---|---|---|---|
| 4,013,875 | 3/1977 | McGlynn | 235/150.2 |
| 4,354,339 | 10/1982 | Nokes | 56/10.2 |
| 4,626,993 | 12/1986 | Okuyama et al. | 364/424 |
| 4,628,454 | 12/1986 | Ito | 364/424 |
| 4,630,773 | 12/1986 | Ortlip | 239/1 |
| 4,674,048 | 6/1987 | Okumura | 364/424 |
| 4,744,207 | 5/1988 | Hanley et al. | 56/16.6 |
| 4,878,598 | 11/1989 | Ruschhaupt, Jr. | 222/1 |

Primary Examiner—Michael S. Huppert
Assistant Examiner—Kenneth Bomberg
Attorney, Agent, or Firm—Kinney & Lange

[57] ABSTRACT

A prime mover has a programmable control system for applying a material, such as a liquid herbicide onto programmed locations in an agricultural field, by creating a program manually on an initial pass of the field in relation to the position of the prime mover, and storing the information in a program for subsequent control in subsequent passes of the prime mover for repeating operations. A microprocessor having a programmable memory is utilized with manual controls for operating a sprayer when weeds are visible, and then correlating the position of the prime mover and the operation to be performed in a subsequent operation and permitting the memory to control the on and off applications of the sprayer. The unit makes use of low cost microprocessors with programmable memories and permits a low cost repeatable operation merely by providing a reference starting position, and a known path in which to travel.

7 Claims, 5 Drawing Sheets

REPEATABLE PATTERN FIELD SPRAYING CONTROL

BACKGROUND OF THE INVENTION

1. Field of the Invention

The present invention relates to programmable controls for performing operations by agricultural vehicles traveling over a field surface.

2. Prior Art

Vehicle operation control systems that operate from programs for performing one or more tasks have been advanced in the art, as shown in U.S. Pat. No. 4,013,875, which has a programmed digital computer or microprocessor that contains a program to operate earth-engaging elements, such as an earth-working tool that may be a rotary, oscillatory, or linearly moveable earth-working tool for performance of given operations. An electromechanical actuator is used for operating the tool.

The device has manual override, but it does not teach precise positioning of the vehicle in relation to a position in the field, and does not teach the ability to repeat the program to perform the operation at previously programmed locations automatically even when visual clues, such as weed growth in need of spraying, are not present.

U.S. Pat. No. 4,744,207 shows a device for operating a cotton compactor on a cotton picker. The inventive concept in this particular patent is a teaching-following program where initially the program is placed into a learn mode, and the operation of the compactor controller is repeated as the unit subsequently is worked. Various sensor inputs for the prime mover itself are used and adjustments, such as "light yield" and "heavy yield" adjustments, can be added to the program for operating the compactor after the selected number of parameters are met.

Straight robotic control for various vehicles or prime movers also has been advanced. For example, the device shown in U.S. Pat. No. 4,674,048 is a robotic system that can be used for moving a vehicle around an obstruction.

U.S. Pat. No. 4,354,339 shows a program for steering and cutting blade control apparatus for a self-propelled lawn mower, utilizing a sensor and drive system that steers the lawn mower and controls the cutting blades through a nylon tape-type control input operating micro switches. The programming is accomplished by having various switch positions programmed on the tape for the desired operations.

Controls which include sensors for steering and operating vehicles are shown in U.S. Pat. Nos. 4,628,454 and 4,626,993.

Additionally, various electronic consoles have been used for controlling sprayers and other devices, and it is common to have speed sensors utilizing either magnetic sensing devices on a driven or non driven wheel, or ultrasonic signals. These also can calculate distance traveled, when the diameter of the wheel is correlated to the revolution of the wheel.

Devices for controlling sprayers and for determining speed are illustratively disclosed herein, and such devices are made and sold by a variety of companies. Thus, these components are shown only schematically herein.

SUMMARY OF THE INVENTION

The present invention relates to a digital microprocessor based memory-control unit for controlling applications of materials onto a field at locations that are programmed in the control, preferable during a first pass across the field. The control unit then can store the program, and by correlating the program to the start position and the movement of the vehicle across the field as determined by suitable sensors the program repeats and will automatically control the location of the application of a herbicide or other material to the field.

Microprocessors or microcomputers that have screen displays can be utilized, but prime movers used in agricultural implements generally have a great deal of vibration, so that rugged, specifically designed digital components are preferable. The control device is used on a prime mover that has a spray bar or other material applicator mounted thereon. It includes a vehicle speed and distance sensor input, and an operable control for applying materials through the spray bar or other applicator.

The programming operation for a sprayer can be as simple as providing a start signal, and running the speed and distance sensor as inputs to a memory device with manual spray start and stop input signals for a spray bar or for a particular section of a spray bar. Manual start and stop signals are placed into the memory for each pass across the field in a teaching mode, and selected signals indicate the end of each pass, and the end of the field.

The program in the memory is stored, and identified with a particular field for a subsequent application of the same herbicide (or other material) on the same spots. The advantage is that spots can be treated separately from the main portions of the field even when the condition to be controlled, such as weeds, is not visible. This is particularly of interest in small grain farming, or sugar beet farming, where at one time of the year during a pass in the field, such as when planting or cultivating, the weeds patches can be seen, but at subsequent times the weeds may well be hidden by the crop.

For example, a program could be created when a field combine or other harvesting machine traverses the field, and then the program can be run for a subsequent herbicide application whether or not weeds are visible.

Also, the control can be programmed for an application of liquid fertilizer for selected spots in the field where growth may be visibly less than other spots during a harvesting operation, and the program can be used for application of fertilizer subsequently. A different rate of application can be used in particular spots, The device is relatively low cost and utilizes its own self-governed navigation system tied in with land marks and start and stop locations, so there is no need for having expensive receivers, or other navigation equipment for determining position

DESCRIPTION OF THE PREFERRED EMBODIMENTS

Figure 1:
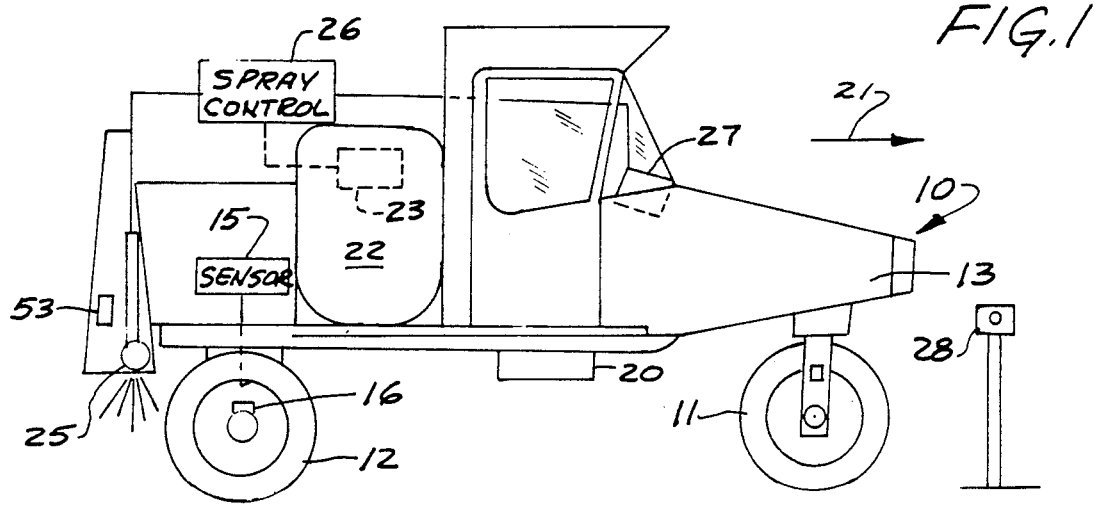
FIG. 1 is a schematic side elevational view of a prime mover shown on a field, and including controls made according to the present invention.

The basic agricultural vehicle or prime mover utilized with the present invention is illustrated in FIG. 1 and comprises a mobile prime mover 10 that is used for spraying a suitable herbicide onto fields, and which includes front steering wheels 11, rear support wheels 12, and a frame 13 that is moved over the ground indicated at 14. A conventional magnetic wheel rotation-counting member indicated generally at 15 which cooperates with elements 16 on a rotating axle determines the distance the prime mover has moved over the ground.

Alternatively, a sonic or radar distance-speed transducer 20 can be utilized for providing distance and speed information for the prime mover 10. Sonic transducers, as well as the magnetic transducers, are made by a variety of companies. The transducers also can provide speed signals as the prime mover moves in a forward direction indicated by arrow 21.

The prime mover frame 13 carries a liquid herbicide tank 22 at the rear portions thereof, and a pump 23 is utilized for providing a liquid under a sufficient pressure to spray bar 25 which is supported on a frame or other suitable support 24 at the rear portions of the prime mover. The spray bar 25 has a plurality of nozzles spaced along the bar.

The spray can be conventionally controlled with a spray controller, such as one made by a variety of companies. The spray controller 26 provides an operator adjustable spray rate, provides monitoring of multiple spray bar sections for pressure and flow, and indicates measurement of the total volume of the liquid applied.

The spray control 26 is operated through a control center 27 which will be more fully explained, but which includes the input devices, microprocessor and memory necessary for the operation of the present invention.

The width of the spray boom 25 can be selected to correspond to that of other implements, such as a grain drill, or a multiple of such widths so the program for the sprayer can be assembled by inputs at the time the field is planted, if desired.

The prime mover 10, which is performing the agricultural operation of spraying existing weed spots, is a standard unit, except for the control center 27, operated in accordance with the present invention.

Figure 2:
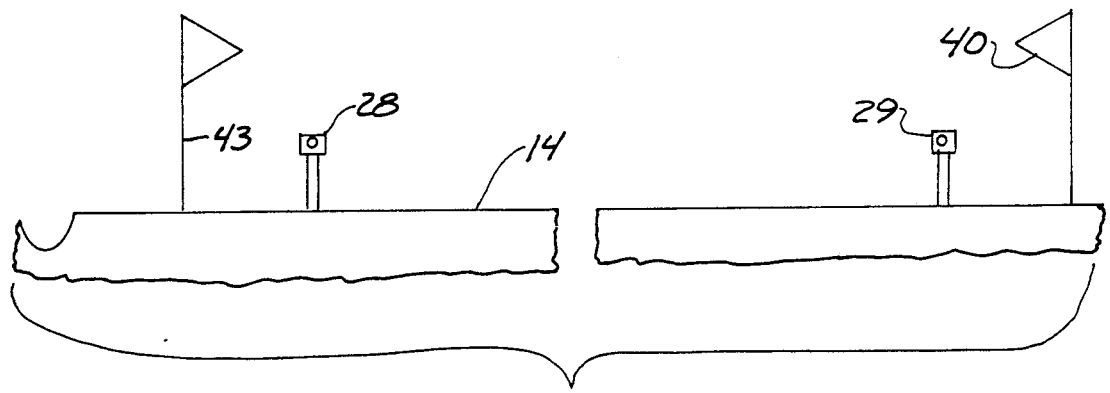
FIG. 2 is a plan view of a typical small grain field, which also could be a row crop field, schematically showing a layout of vehicle guidance and positioning flags for establishing the landmarks.

FIG. 2 illustrates a side view of a field shown ground level 14, which includes a laser beam sender 28 for indicating an end of a pass down the field or in other words, the line where "headland" starts. A second laser beam sender 29 will provide an indicator for an opposite end headland line. These or similar products can be used in conjunction with a receiver 53 on the prime mover (shown schematically), to provide a signal for indicating the end of each pass.

Figure 3:
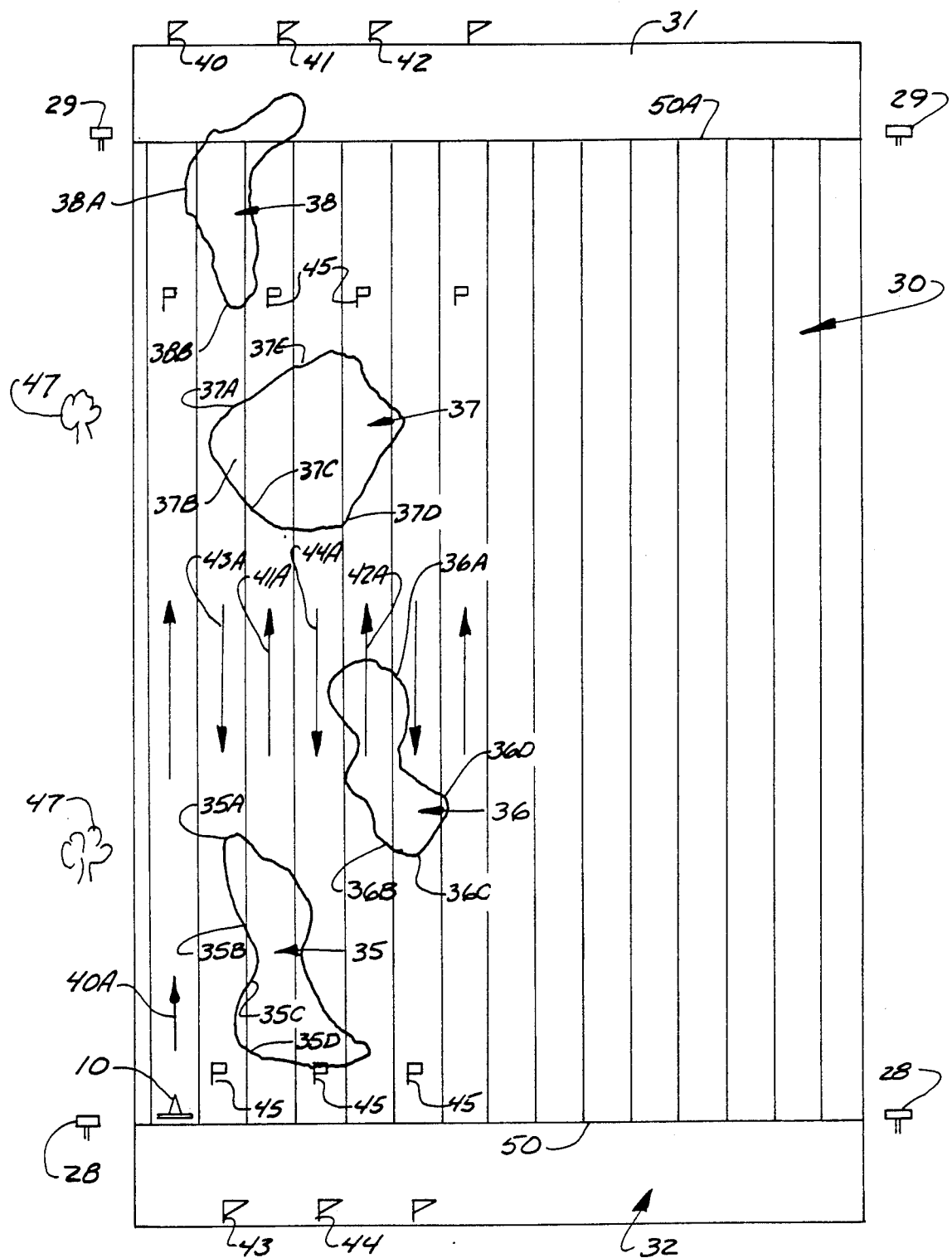
FIG. 3 is a schematic side view showing flags which may be used for guiding the prime mover for its location, and end identifying indicators.

In FIG. 3, a typical agricultural field is indicated at 30, and is shown as rectangular. It can have a desired length, and it is shown with dividing lines indicating individual passes for the agricultural implement being used.

Also, there are horizontal dividing lines at the top and bottom of the drawing, indicating a headland 31, which is the area in which the prime mover and implement being utilized will turn, and a lower or start headland 32 which also is used for turning the vehicle.

The agricultural field as shown has a number of different weed patches shown at 35, 36, 37 and 38. These weed patches could be wild oats, or other noxious weeds that can be controlled with herbicides, but which may remain in the field from year to year and throughout growing seasons. At certain times in the year these weed patches are more visible than others, and so if a pass over the field is made early in spring when the weeds are visible, a program can be made for spraying the weeds with a herbicide and then subsequently, by proper position correlation, the prime mover 10 can be operated along the same paths as during the programming operation and the spraying or other earth treatment will be controlled automatically.

In order to properly identify the paths to be taken, suitable markers are put into place at the ends of the field. For example, there are end flags indicated as being typical at 40, 41 and 42 adjacent to headland 31, which are used as aiming flags and are substantially in the center of each path traveled by the prime mover as it traverses the field in passes in a first direction. There are typical flags 43 and 44 which are centered in passes going in an opposite direction. For purposes of this application a "pass" means traveling the field in one direction from one end to the other. A "round" is two passes, which completes a round trip down the field and back.

Additional small secondary flags 45 can be used and centered in the pass. These are also shown at both ends of the field for their respective passes. These secondary flags can be used for alignment.

The prime mover 10 is shown in the first pass in this field in FIG. 3. It has moved beyond the headland line 50, so a signal indicating the prime mover crossed the line 50 and is moving onto the field can be provided either automatically or manually.

Additionally, natural or artificial landmarks 47, which are positioned laterally to the movement of the prime mover 10 are illustrated to indicate whether the position of the prime mover or agricultural vehicle is in a proper location in relation to a particular portion of the program that is being used.

Figure 5:
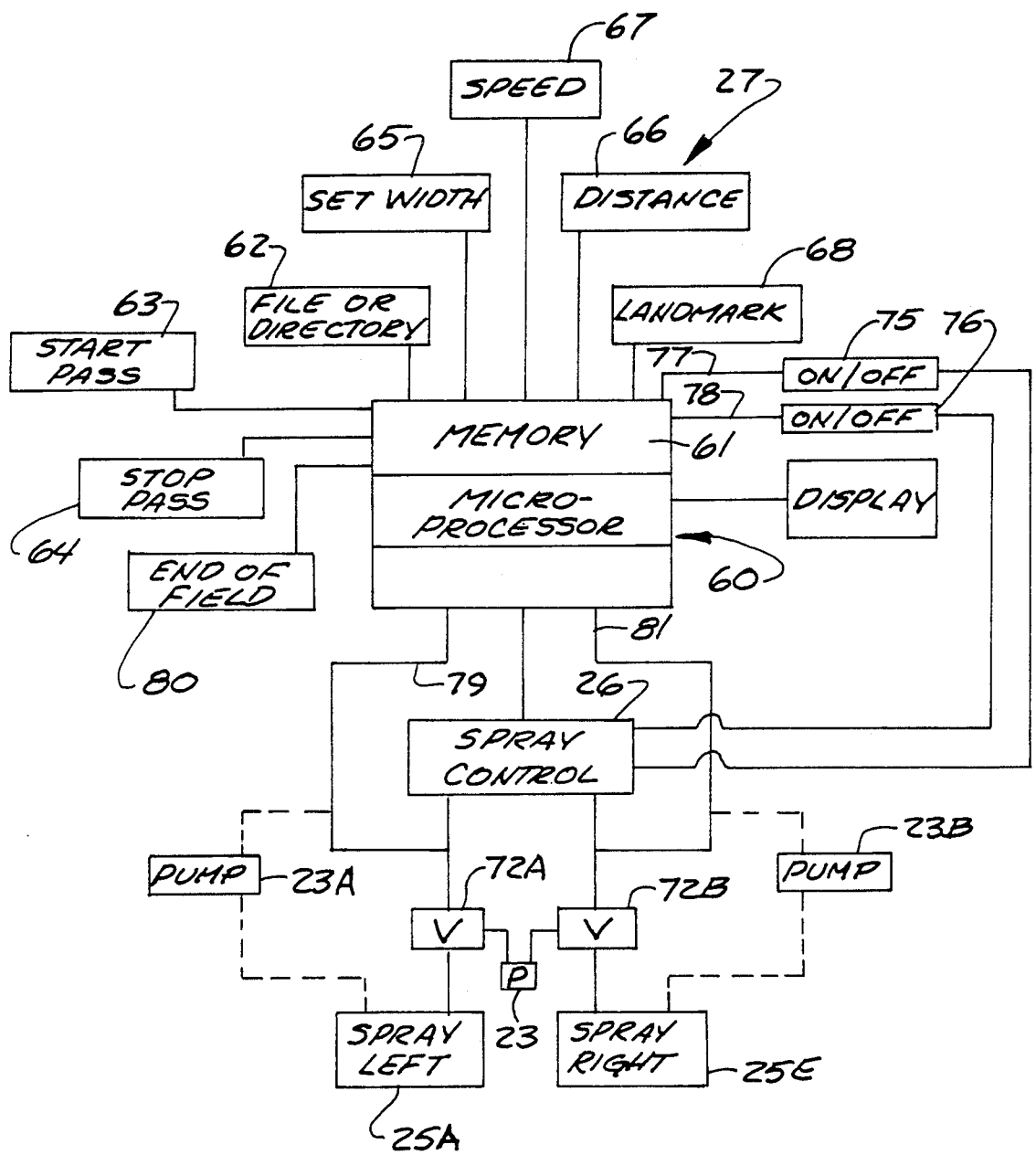
FIG. 5 is a block diagram of a typical control system utilized with the present invention.

The control center 27 is shown schematically in FIG. 5, and includes a microprocessor 60 that includes a programmable memory 61. The microprocessor 60 provided has outputs in response to events and several inputs into the memory are provided. The microprocessor provides information and control signals to the spray control 26, so that the spray can be turned on and off and then operated after a start signal has been receive until a stop signal is received from the microprocessor 60. In a more basic form of the invention the pump to the spray bar can be controlled on and off to control spraying.

The inputs to the memory include a file or directory name input 62 that can be manually selected so that the particular field can be identified in the program for subsequent use. This is important if there is a display. The program stored in the memory could be separately identified in some other suitable manner so that it would be used only in connection with the field being worked upon.

A start-pass signal 63 can be provided manually, or from one of the laser beam senders 28 acting in conjunction with a receiver 53 mounted on either side of the support frame 24 for the spray bar, to indicate that the spray bar 25 is aligned with the headland line 50. The start-pass signal will be an input signal that would indicate to the microprocessor that the spray control 26 should be activated. A stop-pass signal 64 likewise could be provided, to indicate the reaching of the headland line 50A. This can be done with the laser source 29, or through manual actuation of a switch or other signal input when the headland is crossed.

The controls would include a program input that would permit setting the width of the spray bar with a "set width signal" 65. This signal would be for example, an indication that the spray bar width was 60 feet wide, and by suitable programming, the width signal can then be used as a basis for determining the number of acres covered in view of the distance signal, and with a speed calculation the memory can provide information such as acres per hour. Further, if programming is done with an implement having a different width from the sprayer, the set width signal may be utilized for changing the spraying start-stop signals to be correct for a double width sprayer when the programming is done with a single width implement, for example, a narrower planter than a spray bar.

Additionally, the memory receives a distance input from a distance sensor shown schematically at 66, which would provide signals such as from the magnetic sensor 15 and magnet 16, correlated to the rolling radius of the tire supporting the prime mover, or the signal for distance can be directly from a sonic speed and distance sensor. The sonic sensor is actually a speed sensor, but by coordinating it with a built in clock in the microprocessor the distance traveled can be determined.

It should be noted that while the magnetic sensor shown is shown at a rear wheel, it is normally placed on a nondriven wheel.

The speed signal input indicated at 67 may be a separate speed signal, from an external sensor, or can be provided by calculating the distance traveled over a length of time using the microprocessor 60.

The start-pass and stop-pass signals can be counted in order to determine what pass the prime mover is on, and this information is also used in any translation or transposition program for converting the stored pattern into a program operating a different width of spray bar.

An indication of a landmark can be provided with an input switch (manual) 68. The landmark signal can be an audible signal or a visual light signal to indicate that a landmark is being passed.

While one control for an entire spray bar width will work, the controls can also be divided up to separately control two or more individual spray bar sections. Two section controls are shown, but they can be provided for any number of different spray bar sections. The spray control 26 normally operates through suitable control valves shown at 72A and 72B that can provide on-off controls from the pump 23 to the spray bar sections indicated schematically at 25A and 25E. Again the controls for two spray bar sections are for schematic illustration, and there can be many more sections utilized if desired.

The valves 72A and 72B are solenoid valves which control the flow of material from the pump 23 to the spray bar. The solenoid valves are normally controlled through the spray control 26, but in this instance are operated through on-off switches 75 and 76, which are manually operated and can be used in the programming operation. The switches 75 and 76 are also connected to the memory through lines 77 and 78 so that a signal is given to memory that a particular spray bar section is being turned on when the respective switch 75 or 76 is turned on, and also a signal will be given when the respective switch 75 or 76 is turned off.

In the operation, then, the signals from switches 75 and 76 will be used for operating the valves 72A and 72B to cause the respective spray bar sections illustrated at 25A and 25E, for example, to spray on the material.

The spray on-off is repeated in each of the passes, until the end of the field is reached, at which time an end of the field signal can be provided from an input 80.

The signals from the on-off switches 75 and 76 carried along lines 77 and 78 to the memory, are recorded in the memory, stored and used the next time the field is traversed by the particular implement and the areas of interest are to have materials applied to them.

When the unit is in a programmed operation, outputs on lines 79 and 81 are provided to the respective valves 72A and 72B in accordance with the program for turning them on and off.

An alternative shown with dotted lines, is with pump sections 23A and 23B provided to receive the signals from the input switches 75 and 76 to directly control the pumping of the liquid herbicide to one spray bar or spray bar section. Thus, instead of solenoid valves being turned on and off, the pump can be turned on and off to control spraying by the spray bar.

The program may be set up to have the field length divided up into a number of cells in the memory, such as 70 cells for the field length in the memory. With an effective field length of 2400 feet, each "cell" would be 34.3 feet in length. If cells are used spray could occur along the entire length of the cell if spray is initialized at any point within the cell. The width of the "cells" depends on the width of the active spray bar section controlled.

Referring back to FIG. 3, the prime mover 10 is in the lower left corner, and having just passed the headland line 50, the start-pass signal was received by the memory. The prime mover will move in direction as indicated by the arrow 40A as aligned with the flag 40, and as checked with the flag 45. During this spray pass no spraying will occur until the prime mover reaches the position adjacent the headland line 50A, for example at the portion 38A shown in the weed patch 38, the operator will cause the right sprayer bar section to be activated with switch 75 to provide herbicide to that sprayer bar section. As explained above, if "cells" are used, the spray can be on for at least 34.3 feet.

The spray will be shut off when it reaches the headland line 50A, either automatically by using the signals from the laser sender 29, or manually with switch 75, or by reaching the end of a program pass. A turn will be made in headland 31, and spraying will be commenced on both sides of the spray bar immediately upon passing the headland line 50A. This can be manually programmed in on the first trip over the field by turning on both of the switches 75 and 76. When point 38B is reached, the spray will again be shut off. If the program is divided into cells, spray could continue until the end of the appropriate cell is reached. The prime mover would be traveling in the direction as indicated by the arrow 43A, and then as it traverse toward the weed patch 37, when the left spray bar reached point 37A it would again be turned on by the signal from the switch for that spray bar section. The signal would be recorded in memory during the time the portion 37B is being sprayed. When point 37C is reached in the second pass the spray bar would be turned off and that signal recorded.

The spray would remain off until the spray bar reached point 35A in weed patch 35, at which time the left spray bar would again be activated by operating the appropriate switch, which would then be recorded in memory. Upon reaching point 35B the spray bar would be shut off (manually during programming) and this would also be recorded in memory. At point 35C the left spray bar section is turned on again and it is on until reaching point 35D.

On a third pass direction indicated by the arrow 41A toward the flag 41, the spray bar sections would be turned on shortly after crossing the headland line 50, to spray across the weed patch 35, and then would be turned off when the weed patch 35 had been cleared.

The spray bar sections would be turned on again at point 37D for the weed patch 37. If the right section was turned on first, the left section would then be turned on at least by the time it reached the point 37C when traveling in direction indicated by arrow 41A in the third pass. Again the line up with the flags 41 and 45 would insure a straight line and very accurate positioning.

When points 37A and 37E are reached, the respective spray bars could be turned off in appropriate locations. On the fourth pass, going in the direction indicated by 44A, when point 37E was reached the spray bar would be turned on again providing signals to the memory, and turned off when point 37D was reached.

The pass indicated by arrow 42A will be programmed to turn on the spray when one reaches the point 36B of weed patch 36, and turning off at least the right hand spray bar in the vicinity of point 36A. The spray would be turned on and off to cover patch 37. This action then would continue on the return pass by inputs at 36A and 36D and off signals at 36C. The operation would continue with passes laterally across the field until the end of the field had been reached. The particular locations of spray operations would be recorded positively in the memory and related specifically to the distance travelled from each of the headlands on each of the passes. Again, if cells are used, the start and stop signals for spraying could affect the entire cell in which the signal occurs.

Flags 40, 41, 42, 43, and 44 can be quite high, for example in the range of seven (7) feet so they are clearly visible in that particular field and remain in position throughout a growing season at least, and perhaps from year to year, insuring that the operations took place at the appropriate location on the field.

Figure 4:
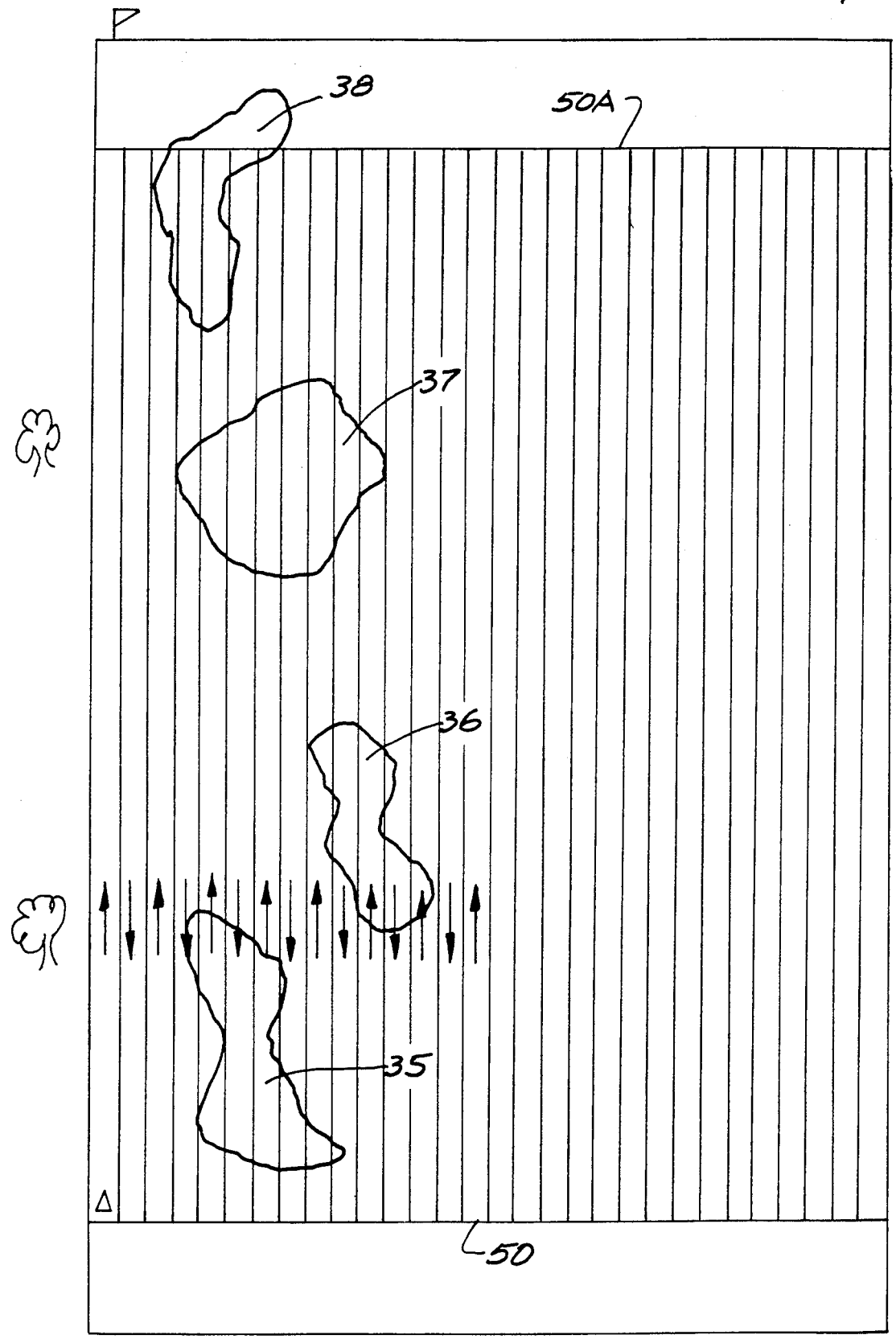
FIG. 4 is a schematic plan view of a typical row crop field for sugar beets showing a planter which would be approximately one-half of a spray bar width for application of herbicide, and which also can be used for programming where a width signal can be placed into the memory for correlating previously programmed information to accomplish control of a double width sprayer.

FIG. 4 is a schematic presentation of substantially the same type of field to illustrate that narrower widths can be used for programming and in this instance, the individual passes are only twenty-two (22) feet wide, and a spray bar that is forty-four (44) feet wide would be used. This means that the passes with the spray vehicle would be twice as wide as the programming passes, and the change in the programming can be accommodated because of the information as to the start of pass and end of pass, as well as distance traveled for each pass. The conversion can be made by suitable programming steps upon input of a different width signal from the signal that was received for the programming operation.

Figure 6:
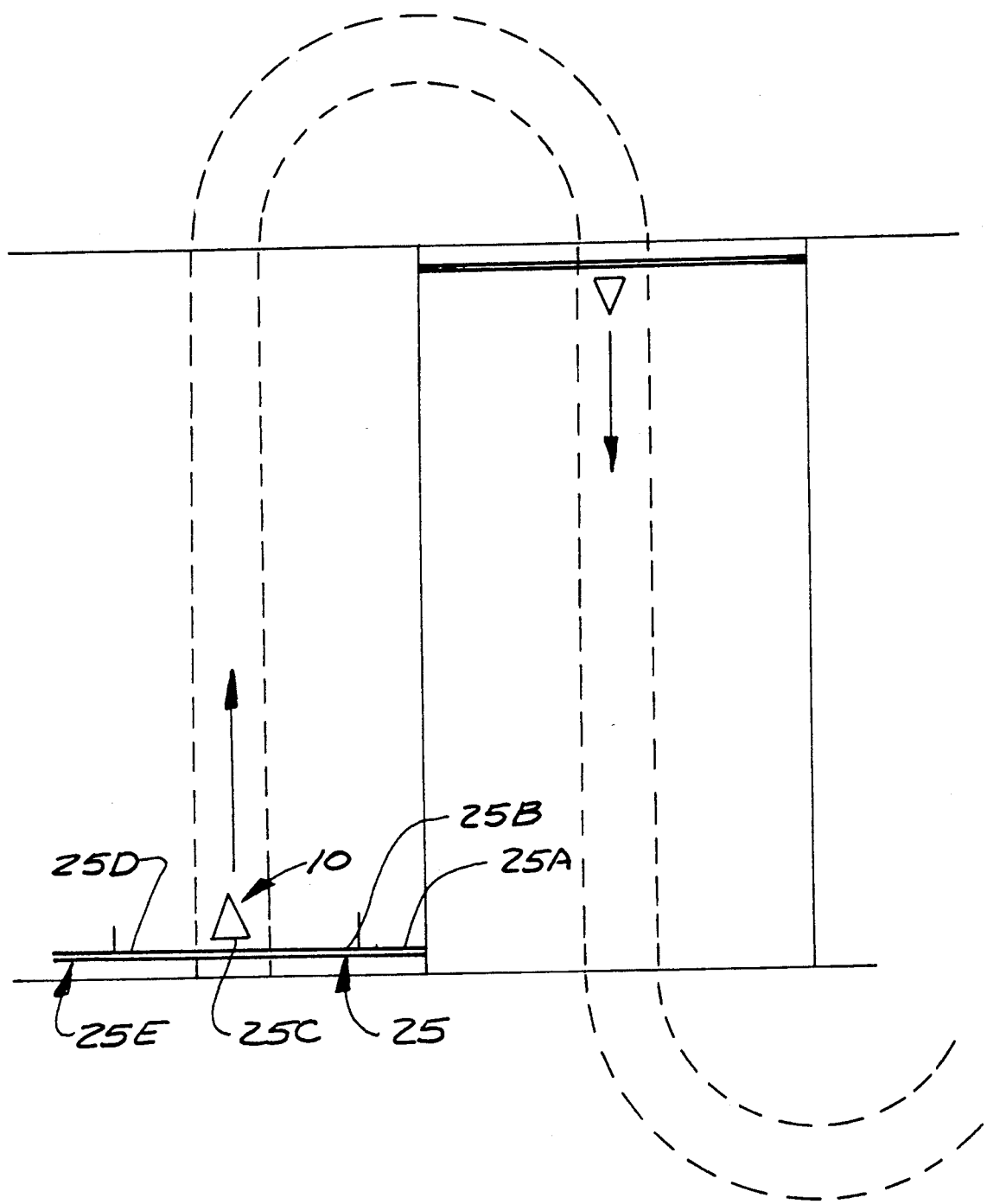
FIG. 6 is a further schematic plan view of a spray bar and prime mover.

In FIG. 6, the prime mover 10 is shown very schematically in a field, but to indicate that the spray bar 25 can be provided with additional sections, other than only the right-left sections. As shown, it can have a right outer section 25A, a right inner section 25B, a center section 25C, which overlies the width of the wheel tracks shown in dotted lines, a left inner section 25D, and a left outer section 25E. While only the sections 25A and 25E are shown in the schematic representation of FIG. 5, merely adding additional control valves and additional individual input control signal devices such as the switches 75 and 76 can accommodate an expansion in boom sections for more precise spraying.

The program code creates the field map and then the microprocessor reads the field map for chemical application control. The map can be divided up into individual cells within the program as stated, so that a record of the field variable such as weeds, or for example areas where a particular type of fertilizer should be applied at a heavier rate, can be inputted easily. The size of the field is also stored in the program because the width input, times the number of passes provides that information.

In certain programs, the length of the individual passes between the headland lines 50 and 50A for example should be entered into the program before starting for determining cell length, but with accurate distance measuring equipment this can also be automatically recorded as the program is entered. The width of the field also can be determined by the number of passes needed times the width of the spray boom, or can be measured initially so that the number of passes can be calculated before starting the programming operation or the spraying operation. This is usually necessary for putting in the end flags, which indicate the center of the pass. In relation to the flags, it is generally believed that it is helpful to color code the flags so that they will remain in a particular color sequence for ready identification from the far end of the field. For example, a color sequence of blue, green, red, white and yellow (which is the alphabetical order of the colors) aids in assuring that the proper flag is aimed at for each of the passes.

The small, disposable flags 45 that are illustrated could be put into the field in the second year. Other flags can also be placed along the sides of the field to mark the border of the headlands, as it is important that the program be started at the correct reference line at the end of the field.

In place of natural landmarks such as those shown, additional flags could be used for providing lateral landmarks for determining whether or not the proper location is being reached as the program is being executed for operation subsequent to creating the program.

When a display is utilized the program and operating software for even a small personal computer is sufficient so that the dimension of the field, the acres covered, the distance from a particular location, and other information can easily be provided by using normal programming techniques. Displays of the field itself can be also generated to visually show what the field looks like, and indicate darkened areas or different colored areas where the weeds are programmed in for spraying. The system allows accurate, spot spraying automatically in small grains using the present invention, with a substantial savings of herbicides or other chemicals being applied.

It also can be noted that suitable indicators can be provided on the control center 27 to indicate when a particular section on a spray bar or boom is spraying or when it is off, and visual indicator lights can be provided if automatic indication of the headland lines is used.

The headlands also can be sprayed after the main field is sprayed by using the same techniques and having guidance flags provided.

The on-off signals will be correlated to the particular pass, and the particular location through use of the distance signal in the memory. This is accomplished by standard programming and operating so that the correlation is correct.

At the headland 50A a stop signal will be provided either by the manual input 64, or by the headland signal system which would show the pass was completed. When a turn was made at the headland and the sprayer was again at the opposite headland line, the start pass signal would be provided to count a second pass. The spraying then would be programmed in manually, so that the program was derived for a particular field and correlated to that particular field for the passes.

At the end of the field, the end of field signal from a signal input 80 is provided, and the program would be set and stored for this particular field. The memory could be a replaceable memory chip that could be removed and stored, and appropriately marked and then placed into the microprocessor the next time that particular field was going to be worked, so that the process would repeat. The information can be transferred to a storage disk or down loaded to some other permanent data storage device.

If a narrower programming device (planter) is used then the operating device, by recording the number of passes and distances, a conversion can be made (by suitable programming again) so that the start-stop signals would occur at the correct location. In general, when the length is divided up into cells in the memory the cells represent a certain distance and a certain width, so the set width signal 65 would determine the width of the cell, and the distance signal 66 would determine when each individual memory cell would be completed.

Once this programming information has been stored in the memory, it can be called up and used by the control center 27.

With a suitable display the position on the pass, the pass number, and other information can be visually displayed from the microprocessor so that a real time relationship of the prime mover to the field can be seen.

With the low cost of microprocessors, and the ability to program manually, the field map can be used without external navigation or any external controls, but merely correlated to physical start points and pass guiding flags for operation.

Although the present invention has been described with reference to preferred embodiments, workers skilled in the art will recognize that changes may be made in form and detail without departing from the spirit and scope of the invention.

What is claimed is:

1. An apparatus for creating and storing a program in permanent data storage, and for subsequently repeating a previously created and stored program for automatically repeating application of a material onto soil in portions of a preselected field, including a programmable microprocessor adapted to be carried on a prime mover and including an operative program correlated to a known start position in a field for application of a material to control a condition in the field, the prime mover traversing the field in a number of repeatable passes each laterally offset from the others and having a length, controllable apparatus adapted to be carried on the prime mover for applying the material to soil, said programmable microprocessor including a programmable permanent data storage memory, means for inputting signals to start and stop the controllable operation of the apparatus into said programmable permanent data storage memory by an operator of the prime mover during initial passes across the field and storing the start and stop signals for use at a subsequent time when traversing in substantially the same path in the field, means for providing a signal to the programmable memory indicating the distance traveled by the prime mover from a reference position, and control means responsive to signals from a previously stored program from permanent data storage correlated to the distance signal and correlated to each particular pass along the field after the start position for operating the controllable apparatus to apply the material and for automatically turning the controllable apparatus on and off during each subsequent pass duplicating the initial pass across the same field when the program was created.

2. The apparatus as specified in claim 1, wherein said application is spraying of a liquid weed control material onto the ground.

3. A method of initially programming into programmable memory and automatically repeating regions of material application onto soil in a preselected field including the steps of providing a programmable memory processor on a prime mover, inputting first signals indicating the distance position of a prime mover from a start position in each of a number of repeatable passes in such preselected field of the prime mover across the field during an initial operation in the field, manually inputting second signals into the programmable memory to signal starting and stopping application of the material while the prime mover is traversing the field during an initial operation, storing the first and second signals in permanent data storage for use at a subsequent time, activating the program of the permanent data storage for the particular field for use with such prime mover for applying the same material to the field, and automatically controlling the start and stop of application of material by the program from permanent data storage at the same positions on the respective passes across the same field as previously recorded in the permanent data storage.

4. The method of claim 3 including the step of providing markers for guiding the path of the prime mover during both the initial operation and at the subsequent time.

5. The method of claim 4 including the step of inputting landmark signals into the programmable memory at positions between the ends of at least one pass of the prime mover.

6. The apparatus of claim 1 and means for indicating a start of a pass across the field coupled to said programmable memory, means for indicating the end of a pass coupled to said programmable memory, and wherein said means for manually inputting signals to start and stop the controllable operation of the apparatus is coupled to apparatus for dispensing materials to simultaneously operate the apparatus and provide programming signal during traveling of the prime mover across a field.

7. The method of claim 3, wherein the inputting of first signals comprises utilizing a sensor for measuring the distance traveled by the prime mover in each pass, and the step of manually inputting signals into the program to signal starting and stopping of application of material includes starting and stopping application of such material while the prime mover is traversing the field during initial operation, and including the step of providing signals to the processor indicating the start and stop of each pass across the field by the prime mover.

* * * * *